United States Patent [19]
Nichols

[11] 3,884,434
[45] May 20, 1975

[54] HELICOPTER HYDRAULIC OIL SYSTEM
[76] Inventor: Richard P. Nichols, 5 Main St., Tarrytown, N.Y. 10591
[22] Filed: Apr. 22, 1974
[21] Appl. No.: 463,051

[52] U.S. Cl. ............... 244/53 R; 184/6; 184/105 R; 244/17.11
[51] Int. Cl. ........................................... B64d 33/00
[58] Field of Search ............ 244/53 R, 17.11, 17.13, 244/60, 1 R; 416/174; 340/270; 184/6, 6.28, 81, 105 R

[56] References Cited
UNITED STATES PATENTS

| | | | |
|---|---|---|---|
| 2,349,898 | 5/1944 | Bechman | 184/6 X |
| 2,450,700 | 10/1948 | Vokes et al. | 184/105 R |
| 2,570,698 | 10/1951 | Manseau | 184/6.28 X |
| 2,921,436 | 1/1960 | Canner | 244/53 R X |
| 3,195,649 | 7/1965 | Nichols et al. | 416/174 X |
| 3,777,852 | 12/1973 | Samalon et al. | 184/105 R X |

FOREIGN PATENTS OR APPLICATIONS

| | | | |
|---|---|---|---|
| 1,506,114 | 6/1969 | Germany | 244/17.13 |

Primary Examiner—Trygve M. Blix
Assistant Examiner—Barry L. Kelmachter
Attorney, Agent, or Firm—Stanley J. Yavner

[57] ABSTRACT

A hydraulic oil system for a helicopter is provided to include a single distributing oil tank for selective connection with a plurality of conduits leading respectively to a plurality of helicopter parts requiring hydraulic oil. The supply oil tank is located in, or within easy access of, the pilot cabin.

9 Claims, 5 Drawing Figures

FIG.1
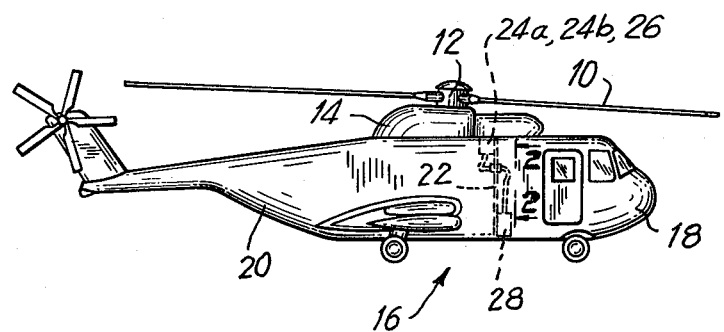
FIG.2
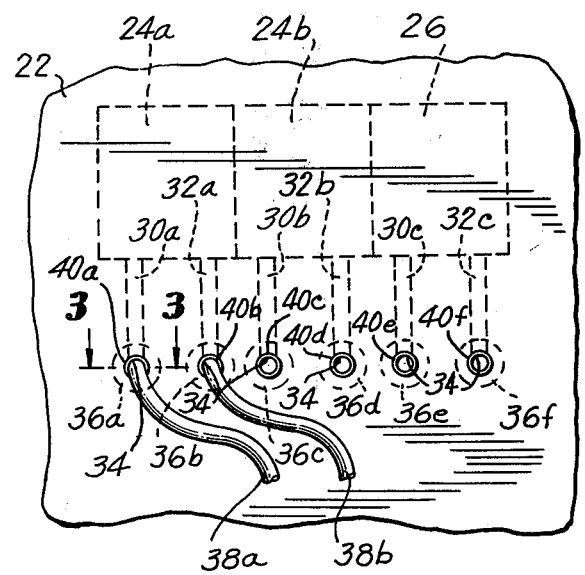
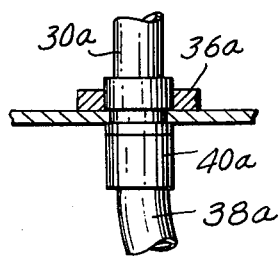
FIG.3

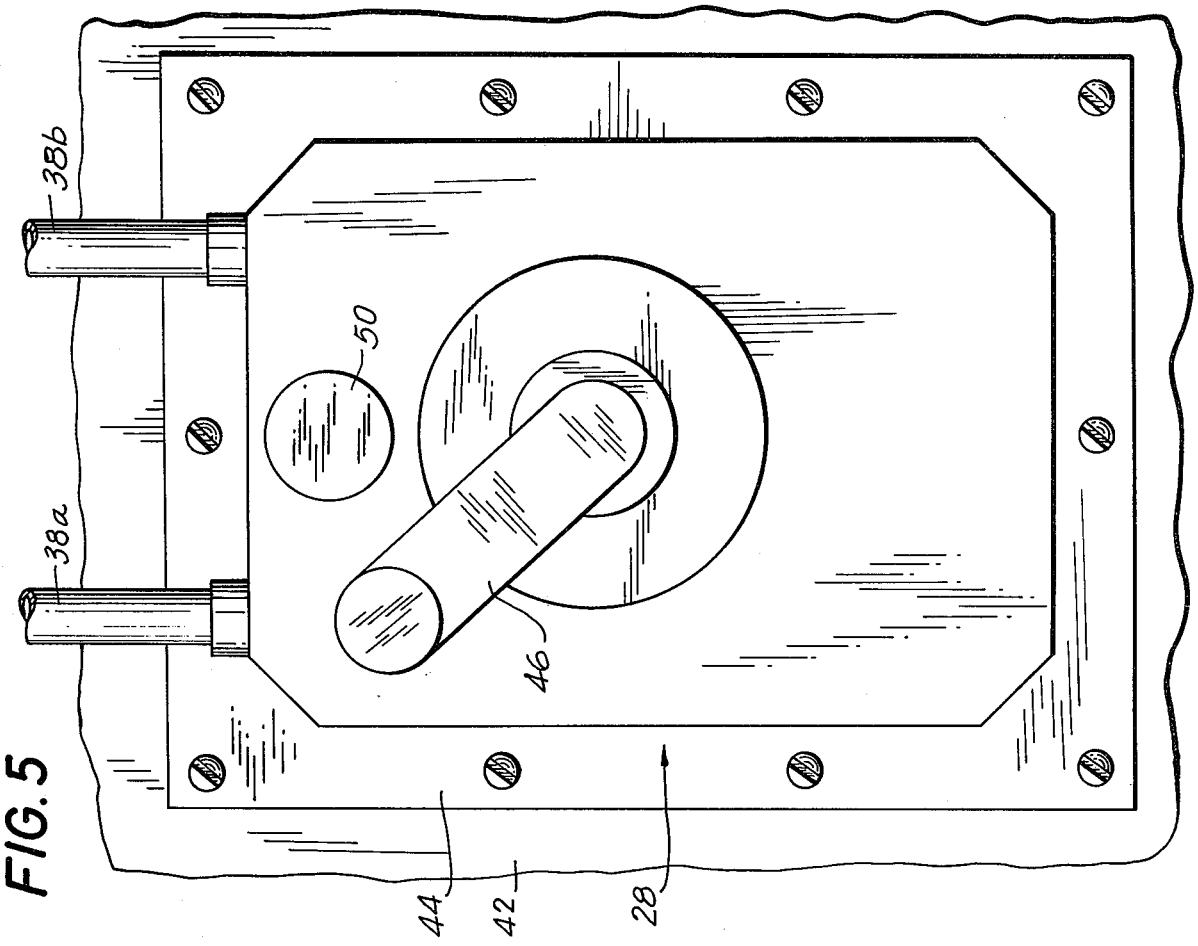
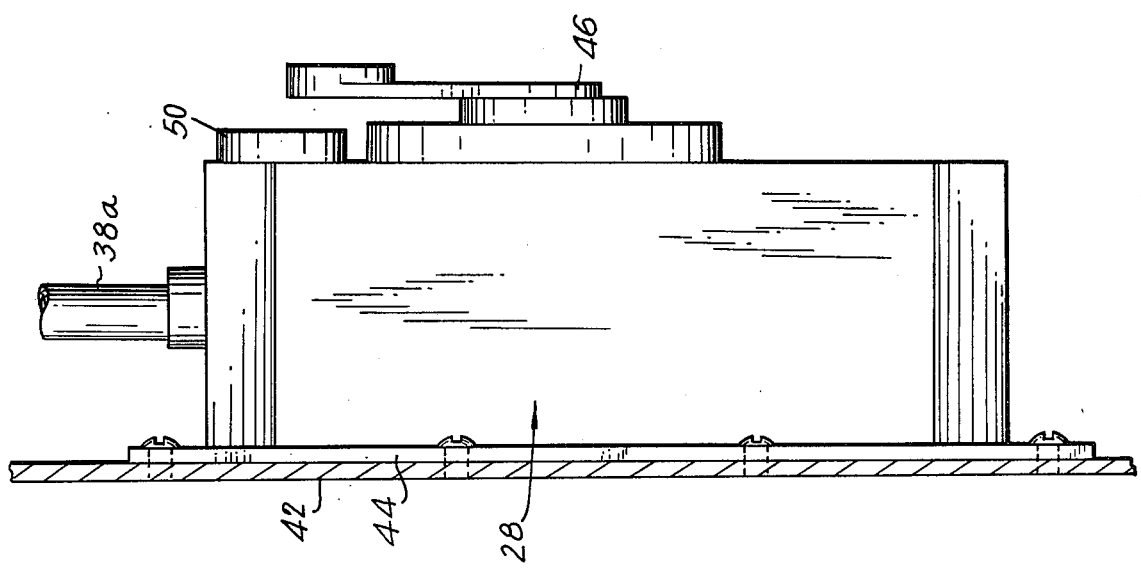

HELICOPTER HYDRAULIC OIL SYSTEM

This invention relates primarily to helicopter hydraulic systems and more particularly to automated hydraulic oil systems for helicopters whereby the oil source is selectively connectable to the various hydraulic points of the helicopter.

It is now customary in helicopters to supply oil to the various hydraulic points including the flight control systems by use of a hydraulic oil feeder. There are usually three or four hydraulic oil storage containers on board including, for instance, a first stage storage container, a second stage storage container and a utility container. These containers are normally connected to the various hydraulic points in the helicopter with such connections being permanent connections. A warning light is included on the indicator panel for the pilot, so that when there is a need for oil in one of the containers, the pilot will know to land the helicopter for the purpose of obtaining a new hydraulic oil supply. Such a warning signal usually occurs when, for instance, the first and second storage containers are empty and when the pilot can only rely upon the utility storage container. Resupply is accomplished within the present state of the art only by landing the helicopter and temporarily connecting to a portable system for feeding hydraulic oil. During the process of resupply, the helicopter is usually grounded for approximately one hour, and this process of resupply is generally required every three or four hours of flight time.

The design of a new system for accomplishing hydraulic oil replenishment within the framework structurally of the existing system is an endeavor which will contribute immeasurably not only to the convenience requirements but also to the safety requirements of both helicopter manufacturers and pilots.

Accordingly, a primary object of the present invention is to provide a system including apparatus for avoiding helicopter down time for the purpose of resupplying hydraulic oil to the helicopter.

A further and more particular object is to provide such a system which accomplishes its purpose without significant re-design of the helicopter.

These and other objects are accomplished in one preferred embodiment of the present invention which features a helicopter including a fire wall separating the pilot compartment from the more flammable portions of the helicopter. The fire wall defines a plurality of openings to which are attached on the side of the fire wall opposite to the pilot compartment a plurality of conduits leading to the various hydraulic oil storage and utility containers presently found on most helicopters. The fire wall terminus of each conduit is connected through valves for the purpose of controlling a flow therethrough. Each storage and utility container is connected to a service conduit and a return conduit.

On the other side of the fire wall, each of the above mentioned openings is associated with a quick disconnect connect joint in order to facilitate the expeditious and positive coupling of supply tank conduits leading from a supply tank located within the pilot compartment.

Since each storage and utility container is permanently connected to the various hydraulic points of the helicopter, a reservoir for providing hydraulic oil to such points for an extended period of time can be maintained by connecting the supply tank selectively by means of the quick disconnect joint to the storage or utility container which has reached a certain predetermined low level of hydraulic oil supply.

The above brief description, as well as further objects, features and advantages of the present invention, will be more fully appreciated by reference to the following detailed description of the preferred but nonetheless illustrative embodiment when taken with the accompanying drawings, wherein:

FIG. 1 is a side view representation of a helicopter including a fire wall separating the pilot compartment from the more flammable portions of the helicopter and showing a supply tank mounted within the pilot compartment at the lower end of the fire wall and the commonly found storage tanks behind the fire wall and attached to the upper end thereof;

FIG. 2 is a front sectional view of the fire wall taken along the line 2—2 of FIG. 1 and showing particularly the placement of storage and utility containers and associated openings to which are attached a plurality of conduits connectable to a pair of supply tank conduits leading from a main supply tank;

FIG. 3 is a top sectional view of an opening in the fire wall with associated valve and conduit means on one side and quick disconnect joint and supply tank conduit means on the other side;

FIG. 4 is a side view representation of the supply tank showing the placement of the supply tank conduits and a wobble pump for facilitating the transfer of contents to the storage and utility containers; and FIG. 5 is a top view representation of the supply tank of FIG. 4.

Referring to the drawings, a helicopter including rotor blade 10, rotor head 12 having dampers (not shown) engine 14 and a body, generally designated 16 is shown along with other apparatus usually associated with a conventional helicopter. Helicopter body 16 is divided generally into pilot compartment 18 and rear compartment 20 by fire wall 22. Storage containers 24a, 24b and utility container 26 are mounted within the rear compartment 18 at the upper end of fire wall 22. Supply tank 28 is also mounted on the fire wall 22, but within the pilot compartment 18 and at the lower end of fire wall 22.

A plurality of service conduits 30a, 30b, 30c and a plurality of return conduits 32a, 32b, 32c all connect the storage utility containers to openings 34 defined by fire wall 22. The service and return conduits are respectively connected at the fire wall through valves 36a–36f, controlling the flow therethrough. Supply conduits 38a, 38b complete the flow path from the storage and utility containers to the supply tank and are selectively connectable to the service and return conduits 30a–30c, 32a–32c by means of quick disconnect joints 40a–40f located at the point of the fire wall.

The supply tank 28 itself is shown of a scale to indicate approximately a two gallon capacity; however, any sized supply tank may be used in keeping with the size of the vehicle and the room available within the pilot compartment. The mounting of supply tank 28 may be by means of fire wall 22 as shown in FIG. 1 or by means of mounting support 42 and mounting plate 44 shown in FIGS. 4 and 5.

Included within the supply tank apparatus is a wobble pump 46 for controlling the pressure within supply tank 28 and within the various conduits heretofore described. By such control, servicing by maintaining the supplies of hydraulic oil is efficiently accomplished. The supply tank 28 is itself filled by means of an opening covered by cap 50 shown in FIGS. 4 and 5.

In order to provide a more complete understanding of the present invention, a series of operational steps will now be described with reference to the structural elements of this invention. Assuming that a warning light indicated to the pilot of a helicopter that hydraulic oil was substantially depleted in storage containers 24a, 24b, the pilot would, while still in flight, connect service line 38a to quick disconnect joint 40a and return conduit 38b to quick disconnect joint 40b. The pilot would then, by electric, electronic or other means, adjust valve 36a to an open position and he would likewise adjust valve 36b to an open position. It is to be understood that all valves in the illustrative embodiment are considered to be "normally closed," so that the opening of the valves can be accomplished in conjunction with inserting supply conduits into the quick disconnect joint associated with the particular valve. In other words, electric, electronic or other means includes some means known to the art by which insertion to the quick disconnect joint would simultaneously open the valve and removal from the quick disconnect joint would return the valve to its "normally closed" position.

The system is now ready for replenishment of the hydraulic oil in the first stage or first storage container 24a. The pilot would now adjust the pressure in the system to cause a flow through supply conduit 38a and service conduit 30a to the first storage container 24a by means of proper adjustment of the wobble pump 46. Hydraulic oil now flows to first storage container 24a and any overflow is fed back to supply tank 28 by means of return conduit 32a and supply conduit 38b. As soon as storage container 24a is filled, the supply conduits 38a, 38b are removed from their respective quick disconnect joints 40a, 40b and the supply conduits are then respectively connected to quick disconnect joints 40c, 40d leading to the next stage or second storage container 24b.

The same procedure is followed with respect to causing a flow by means of wobble pump 46 and upon completion of flow to all containers needing replenishment, such containers are then able to themselves supply hydraulic fluid to the points to which they are permanently connected such as rotor head 12 and the dampers associated with that head.

The above illustrative embodiment is not to be considered to limit this invention to a hydraulic oil system for a helicopter, since it is contemplated by the present inventor that a lubrication system for a helicopter could make use of the same structural system. For instance, if the various storage and utility containers are connected permanently to lubrication points rather than hydraulic points, a lubricating oil in supply tank 28 would feed the rest of the system selectively when an indicator or warning light signalled the need for such lubrication or the need for replenishment of a lubrication storage element.

What is claimed is:

1. A helicopter including hydraulic oil feeding apparatus for attachment to mounting means and for replenishing hydraulic oil containers permanently connected to hydraulic points of said helicopter, said apparatus comprising a supply tank, a single pair of supply conduits connected to said tank and leading to said means, quick disconnect joints at said means for facilitating connection and disconnection of said supply conduits, service and return conduits leading from each of said containers to said joints for establishing flow with said single pair of supply conduits, said single pair of supply conduits being arranged for selective connection of one of said containers to said supply tank.

2. The invention according to claim 1 wherein valves control fluid flow through said service and return conduits.

3. The invention according to claim 2 wherein said valves are attached at said means to the ends of said service and return conduits.

4. The invention according to claim 1 wherein said supply tank includes a wobble pump for controlling fluid pressure in said apparatus.

5. The invention according to claim 1 wherein said supply tank defines an opening through which said tank is filled and a removable cap for closing said opening.

6. The invention according to claim 1 wherein said apparatus includes a number of service conduits equal to the number of said containers.

7. A helicopter including hydraulic oil feeding apparatus for attachment to mounting means and for replenishing hydraulic oil containers permanently connected to hydraulic points of said helicopter, said apparatus comprising a supply tank, a pair of supply conduits connected to said tank and leading to said means, quick disconnect joints at said means for facilitating connection and disconnection of said supply conduits, service and return conduits leading from said containers to said joints, all arranged for selective connection of said containers to said supply tank, said means being a helicopter fire wall, said supply tank being located on one side of said wall and said containers being located on the other side of said wall.

8. The invention according to claim 7 wherein said helicopter further includes a pilot compartment and said supply tank is attached within said compartment.

9. The invention according to claim 8 wherein said containers are attached to said fire wall.

* * * * *